C. W. SMITH.
THEATRICAL SCENERY DEVICE.
APPLICATION FILED JULY 2, 1914.
1,147,823.
Patented July 27, 1915.
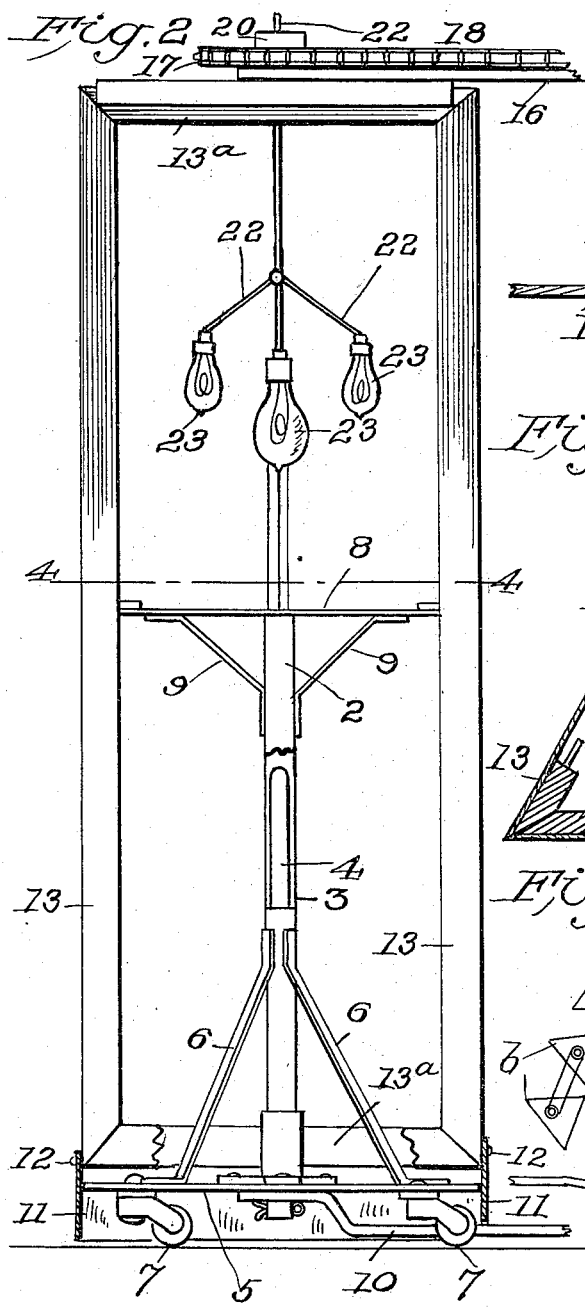
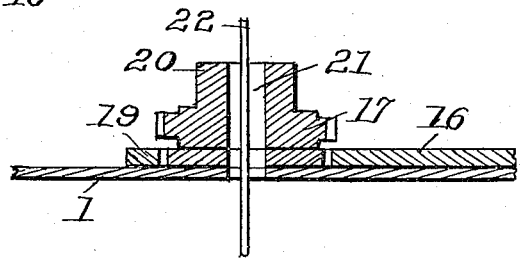
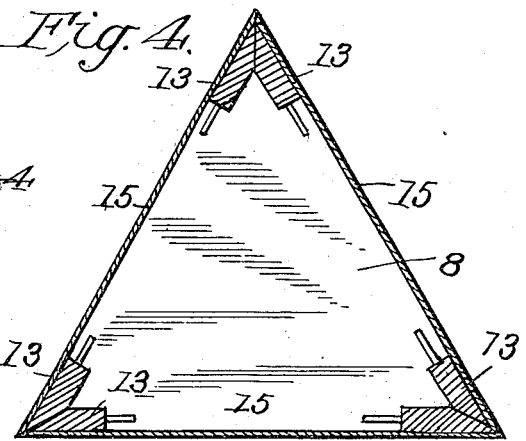
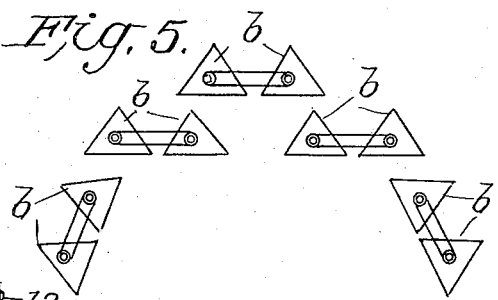

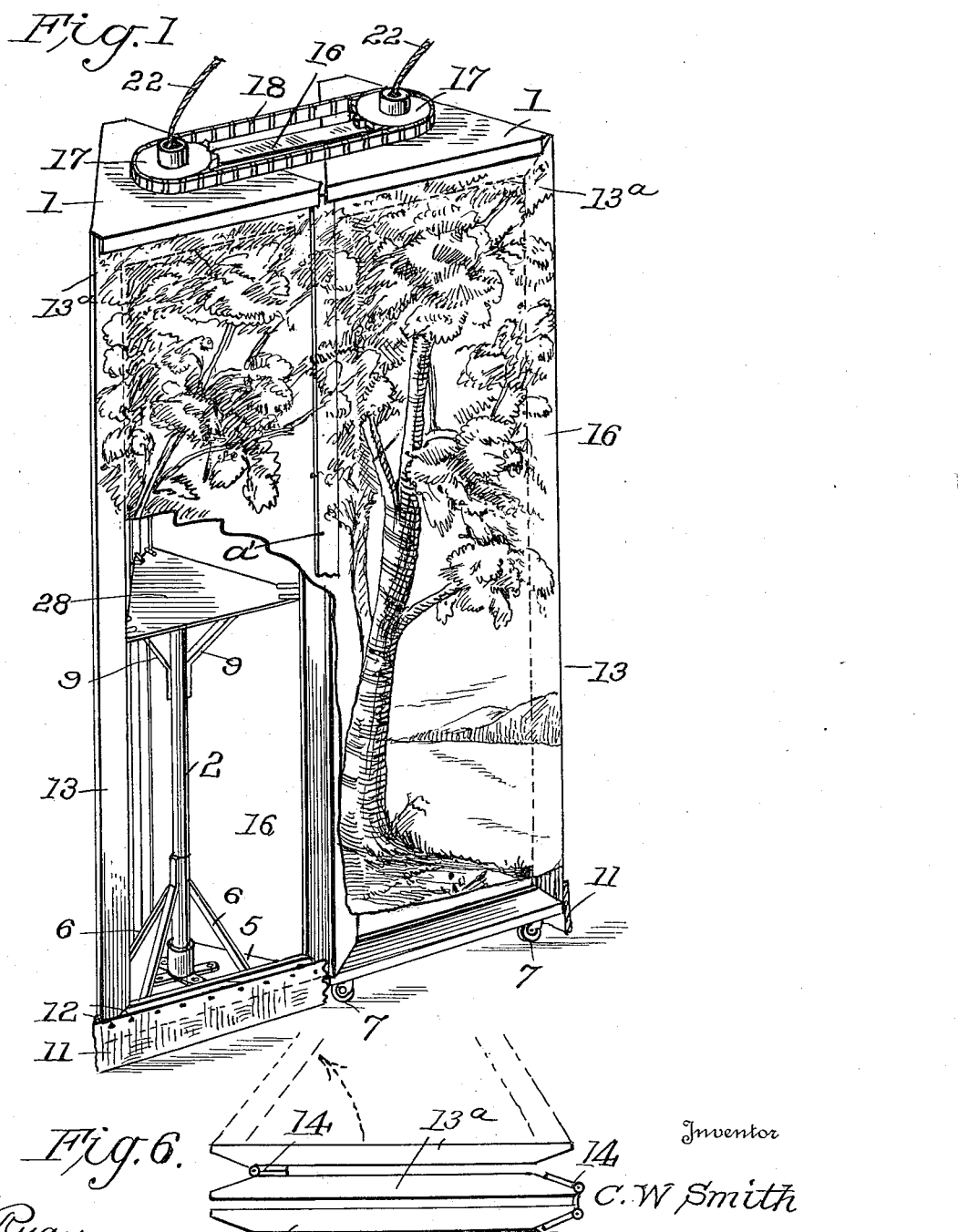

UNITED STATES PATENT OFFICE.

CHARLES W. SMITH, OF CHICAGO, ILLINOIS.

THEATRICAL-SCENERY DEVICE.

1,147,823.  Specification of Letters Patent.  Patented July 27, 1915.

Application filed July 2, 1914. Serial No. 848,663.

*To all whom it may concern:*

Be it known that I, CHARLES W. SMITH, a citizen of the United States, residing at Chicago, in the county of Cook and State of Illinois, have invented certain new and useful Improvements in Theatrical-Scenery Devices, of which the following is a specification.

This invention relates to theatrical scenery, and one of the principal objects of the invention is to provide a plurality of pairs of rotated members of triangular cross section, each member in a pair having a scene painted on three of its sides, and each pair being mounted so that the triangular elements are rotated to bring into view three different scenes represented upon the different sides, and a number of these pairs of devices being used to set a stage.

Another object of this invention is to provide a plurality of scenes represented upon the triangular sides of rotated elements, said elements being mounted in pairs, and a number of the pairs being used to represent a certain scene as an entirety, said elements being readily rotated to present another scene to view, whenever required, and the rotated elements being covered with canvas and the scenes painted thereon with translucent paint, and electric lights being mounted inside the elements so that different scenic effects will be produced.

Still another object of the invention is to provide a set of scenes mounted upon triangular elements which are rotated in pairs to change the scenes and said triangular elements being readily folded flat for shipping purposes.

These and other objects may be attained by means of the construction illustrated in the accompanying drawings, in which, Figure 1 is a perspective view of a pair of triangular rotated elements, made in accordance with this invention, and showing a portion of an exterior scene or wood scene represented upon one of the three sides thereof. Fig. 2 is a view looking into the interior of one of the triangular frames with the canvas scene removed. Fig. 3 is a sectional view of the top or upper portion of one of the elements, Fig. 4 is a transverse sectional view taken on the line 4—4 of Fig. 2, Fig. 5 is a diagram showing one manner in which the stage may be set with the pairs of rotated elements, and Fig. 6 is a top plan view of one of the triangular frames folded.

Referring to the drawings, the numeral 1 designates a triangular plate, which may be suitably braced at each angle and mounted centrally in the said plate is a rod 2 having a socket 3 in its lower end. A telescopic member 4 is mounted at its upper end in the socket 3, and at the lower end of the member 4 is a similar triangular plate 5. Diagonal braces 6 extend from the plate 5 to the member 4. The triangular plate 5 is provided with casters 7. Connected centrally within the triangular frame is a plate 8, also of triangular form and diagonal braces 9 extend underneath the plate to the rod 2. As shown in Fig. 1, there are two triangular elements connected together by means of a bar 10 underneath the plate 5, said bar being mounted upon the lower end of the member 4 and extending from one of said triangular elements to the other. In order to cover up the rollers and the bar 10, a piece of canvas 11 is connected to the frame by suitable fastenings 12. Extending vertically from the side of the triangular frame are bars 13, which are mitered together at the corners as shown, and suitable hinges 14 connect the flat sides of the triangular element together, as shown more clearly in Fig. 6, and thus permit the triangular elements to be folded flat to occupy but little space when required to be shipped.

Stretched and secured smoothly on the three sides of the triangular element, are canvas back ground surfaces 15 on which may be painted with translucent paint three different scenes, one representing a woods as at 16, and the other sides representing interior or exterior scenes as is required. It will be understood of course, that any suitable scenery may be applied to the surfaces 15, depending upon the character of the play in which the scenes are to be used.

Connected to the upper triangular plate 1 of each of the pairs, is a crossbar 16, similar to the bar 10. Supported on said bar at each end is a sprocket wheel 17, and extending around each sprocket wheel in the pair is a drive chain 18. The sprocket wheel 17 is mounted upon a suitable disk 19, and a boss 20 is mounted on the upper side of the sprocket wheel, said boss, sprocket wheel and plate being perforated or provided with an opening 21 through which electric light conductors 22 extend, the inner ends of said conductors having electric light bulbs 23 connected thereto.

The triangular plates 5 provided with the casters 7 are held stationary when the scene is set. The casters are for the purpose of moving the triangular members up stage when not required for use. The triangular frames rotate upon the member 4 mounted in the socket 3. The triangular frames are rotated by hand and the sprocket wheels serve merely as means to hold the frames in position when adjusted.

The frame comprising the upright members 13 and the cross strips 13ª can be readily removed from the sides of the triangular element and replaced by others.

The three scenes upon the three different sides of the triangular frame or element, being painted in translucent paint, when the footlights are turned down to darken the stage and the light 23 ignited, the translucent scene is given an entirely different transparent effect, so that with a full set of the triangular elements, six separate and distinct scenes may be produced.

As shown in Fig. 5, the numeral $a$ designates the footlights and $b$ represents a pair of the triangular rotated elements having a scene painted on each of the three sides, as already described, and may be arranged as shown or otherwise in order to give the desired effect.

In order to bridge the vertical space between the triangular sections, strips $a'$ of flexible material, like rubber or canvas, may be secured to the edge of one of the triangular sections to extend over to the other.

Various changes in the details of construction may be resorted to without departing from the spirit and scope of the invention as defined in the claims.

What is claimed is:—

1. In a device of the character described, the combination of triangular supports and separate scenery frames mounted on said supports and connected together by hinges so they can be folded flat for shipping.

2. A theatrical scenery device comprising a pair of triangular supports, one of said supports forming a base, a socket member connected to said base support, a stud mounted in said socket, frames mounted on said triangular supports, said frames being hinged together so that they may be folded flat for shipping.

In testimony whereof I affix my signature in presence of two witnesses.

CHARLES W. SMITH.

Witnesses:
  CLAUDE S. OTTMAN,
  WILLIAM OTTMAN.

Copies of this patent may be obtained for five cents each, by addressing the "Commissioner of Patents, Washington, D. C."